(12) United States Patent
Saitoh et al.

(10) Patent No.: US 11,834,539 B2
(45) Date of Patent: Dec. 5, 2023

(54) PHOTOCURABLE MATERIAL COMPOSITION, CURED PRODUCT OF PHOTOCURABLE MATERIAL COMPOSITION AND MANUFACTURING METHOD THEREOF

(71) Applicant: CANON KABUSHIKI KAISHA, Tokyo (JP)

(72) Inventors: Terunobu Saitoh, Tokyo (JP); Hajime Masumoto, Shizuoka (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/751,929

(22) Filed: May 24, 2022

(65) Prior Publication Data

US 2022/0282020 A1 Sep. 8, 2022

Related U.S. Application Data

(63) Continuation of application No. PCT/JP2020/046162, filed on Dec. 10, 2020.

(30) Foreign Application Priority Data

Dec. 13, 2019 (JP) .................. 2019-225913
Dec. 2, 2020 (JP) .................. 2020-200635

(51) Int. Cl.
| | | |
|---|---|---|
| C08F 2/46 | (2006.01) | |
| C08F 2/50 | (2006.01) | |
| C08G 61/04 | (2006.01) | |
| C08F 283/02 | (2006.01) | |

(52) U.S. Cl.
CPC .................. C08F 283/02 (2013.01)

(58) Field of Classification Search
CPC ....... B33Y 80/00; B33Y 70/00; B29C 64/264; B29C 64/106; C08F 20/26; C08F 2/44; C08F 283/02; C08F 220/281
USPC ..... 522/144, 141, 135, 134, 1, 189, 184, 71, 522/6; 520/1
See application file for complete search history.

(56) References Cited

U.S. PATENT DOCUMENTS

| | | | |
|---|---|---|---|
| 8,344,045 B2 * | 1/2013 | Ohnishi ............... | C09D 11/101 347/100 |
| 9,275,560 B2 | 3/2016 | Zhang et al. | |
| 10,005,915 B2 | 6/2018 | Zhang et al. | |
| 2015/0315325 A1 | 11/2015 | Tabor et al. | |
| 2018/0155481 A1 | 6/2018 | Share et al. | |
| 2020/0056061 A1 * | 2/2020 | Sato ..................... | C08K 5/005 |

FOREIGN PATENT DOCUMENTS

| | | |
|---|---|---|
| JP | 2001-329133 A | 11/2001 |
| JP | 2001329133 | * 11/2001 |
| JP | 2012-008547 A | 1/2012 |
| JP | 2013-112693 A | 6/2013 |
| JP | 2014-529637 A | 11/2014 |
| JP | 2015-120781 A | 7/2015 |
| JP | 2018-53133 A | 4/2018 |
| JP | 2018-522090 A | 8/2018 |
| WO | 2013/019821 A1 | 2/2013 |
| WO | 2016/186728 A1 | 11/2016 |
| WO | 2020/246489 A1 | 12/2020 |
| WO | 2021/117836 A1 | 6/2021 |

OTHER PUBLICATIONS

Anazawa et al., JP 2001-329133 Machine Translation, Nov. 27, 2001 (Year: 2001).*
International Preliminary Search Report in International Application No. PCT/JP2020/046162 (dated Feb. 2021).
International Preliminary Report on Patentability in International Application No. PCT/JP2020/046162 (dated Jun. 2022).

* cited by examiner

Primary Examiner — Jessica Whiteley
(74) Attorney, Agent, or Firm — VENABLE LLP (57) ABSTRACT

Disclosed is a photocurable material composition having a cured product which has both deflection temperature under load of 40° C. or more and Charpy impact strength (with a notch) of 20 kJ/m² or more after ultraviolet irradiation and the cured product thereof. The photocurable material composition comprises at least a monofunctional acrylate having a five-membered ring containing an ether bond and a polycarbonate resin soluble in the monofunctional acrylate, wherein the content of the monofunctional acrylate having a five-membered ring containing an ether bond is 18% by weight to 80% by weight and the content of the polycarbonate resin is 10% by weight to 40% by weight.

20 Claims, 1 Drawing Sheet

PHOTOCURABLE MATERIAL COMPOSITION, CURED PRODUCT OF PHOTOCURABLE MATERIAL COMPOSITION AND MANUFACTURING METHOD THEREOF

CROSS-REFERENCE TO RELATED APPLICATIONS

This application is a Continuation of International Patent Application No. PCT/JP2020/046162, filed Dec. 10, 2020, which claims the benefit of Japanese Patent Application No. 2019-225913, filed Dec. 13, 2019, and Japanese Patent Application No. 2020-200635, filed Dec. 2, 2020, all of which are hereby incorporated by reference herein in their entirety.

BACKGROUND OF THE INVENTION

Field of the Invention

The present invention relates to a photocurable material composition and a cured product obtained by using the photocurable material composition. More particularly, the present invention relates to the photocurable material composition capable of obtaining the cured product having high thermal deformation temperature and the excellent impact resistance. The present invention also relates to manufacturing of a three-dimensional cured product or the like using the photocurable material composition.

Description of the Related Art

Since the photocurable material composition is cured in a short time by light irradiation, it is used as a coating material, a painting material, a sealant, and recently as a material for an optical three-dimensional shaping method. The cured product composed of the photocurable material composition has either of the following problems. That is, some satisfy the impact resistance, but have insufficient surface hardness, thermal deformation temperature, and strength. Some satisfy the rigidity but are brittle and tend to crack when they are coated. There is hardly any cured product known that has both the impact resistance and the rigidity. Therefore, a thermoplastic resin is almost always used instead of the above photocurable material composition for parts requiring the impact resistance and the rigidity. Although injection molding is generally used for molding the thermoplastic resin into the shape of a part, the flexibility of the shape may be limited by the type of materials of a mold or by the type of the thermoplastic resin itself.

In general, when trying to increase the thermal deformation temperature of the cured product of the photocurable material composition, a material having a functional group capable of increasing the crosslinking density or a material having a bulky substituent is selected as the material to be used. When the material having the functional group capable of increasing the crosslinking density, such as a polyfunctional acrylate or an epoxy material, or the material having the bulky substituent, such as an isobornyl group, is photo-cured, stress concentration and poor curing occur in the curing process, and thus the thermal deformation temperature increases but the impact resistance significantly decreases.

On the other hand, when trying to increase the impact resistance of the cured product of the photocurable material composition, a material capable of reducing the crosslinking density or a material having rubber-like properties is selected as the material to be used. When the material capable of reducing the crosslinking density, such as a high molecular weight acrylic or epoxy, or a material having a stretchable functional group, such as urethane, is cured, the impact resistance of the cured product is improved due to the low crosslinking density and the impact absorption caused by the stretching motion of the molecule, but the thermal deformation temperature of the cured product is lowered because the cured product becomes soft.

It is possible to use a combination of a material increasing the thermal deformation temperature and a material increasing the impact resistance in order to achieve both high thermal deformation temperature and the impact resistance, but the cured product mostly becomes one that undermines the respective advantages, so no material formulations have been found that satisfy both high thermal deformation temperature and the impact resistance of the coating material, the painting material, the sealant, an optical three-dimensional shaped object, and a molded object. There are deflection temperature under load (° C.) as the evaluation method of measuring the thermal deformation temperature, and Charpy impact strength (kJ/m$^2$) as the evaluation method of determining the impact resistance. Many of materials having the high impact resistance have deflection temperature under load of less than 40° C. (1.8 MPa load) and many of materials having the high rigidity have Charpy impact strength (with a notch) of less than 5 kJ/m$^2$. A material having deflection temperature under load of 40° C. or more and Charpy impact strength (with a notch) of 20 kJ/m$^2$ or more is required because a shaping is distorted by its own weight when the thermal deformation temperature of the material is low, and a defect occurs in which a thin part is chipped by a small impact when the impact resistance of the material is low.

In recent years, the optical three-dimensional shaping method has been actively developed, and the cured product having the special shape that is difficult to manufacture by injection molding or cast molding has been manufactured. However, an active energy ray-curable material composition used in the optical three-dimensional shaping method does not have both the impact resistance and the rigidity, so the mechanical properties are insufficient for using it as a product or a part.

Based on the background described above, Japanese Patent Application Laid-Open No. 2001-329133 discloses an attempt to improve the active energy ray-curable composition by compounding a polycarbonate with the active energy ray-curable material composition. Moreover, Japanese Patent Application Laid-Open No. 2018-53133 discloses that the cured product obtained by a formula using a combination of a cationic polymerizable organic compound and a radically polymerizable organic compound (B) is excellent in toughness and heat resistance.

In the material formulation disclosed in Japanese Patent Application Laid-Open No. 2001-329133, it is shown that the elastic modulus and fracture energy are high when doing a film tensile test, but it is inferred that Charpy impact strength (with a notch) is unlikely to exceed 20 kJ/m$^2$ considering the value of fracture energy. Moreover, it can be inferred that Charpy impact strength converted from the Izod impact strength does not go up to 20 kJ/m$^2$ or more, although deflection temperature under load exceeds 40° C., in the material formulation shown in Japanese Patent Application Laid-Open No. 2018-53133.

The present invention has been made in view of the above-described background art, and it is the purpose of the present invention to provide the photocurable material composition which has both deflection temperature under load of 40° C. or more and Charpy impact strength (with a notch) of 20 kJ/m$^2$ or more after curing by ultraviolet irradiation and the cured product thereof.

SUMMARY OF THE INVENTION

A photocurable material composition of the present invention is the photocurable material composition comprising at least a monofunctional acrylate having a five-membered ring containing an ether bond and a polycarbonate resin soluble in the monofunctional acrylate having a five-membered ring containing an ether bond, wherein the content of the monofunctional acrylate having a five-membered ring containing an ether bond is 18% by weight to 80% by weight and the content of the polycarbonate resin is 10% by weight to 40% by weight. A cured product can be provided by irradiating the photocurable material composition with light.

The photocurable material composition of the present invention can be used to produce a three-dimensional cured product.

Further features of the present invention will become apparent from the following description of exemplary embodiments with reference to the attached drawing.

DESCRIPTION OF THE EMBODIMENTS

Figure 1:
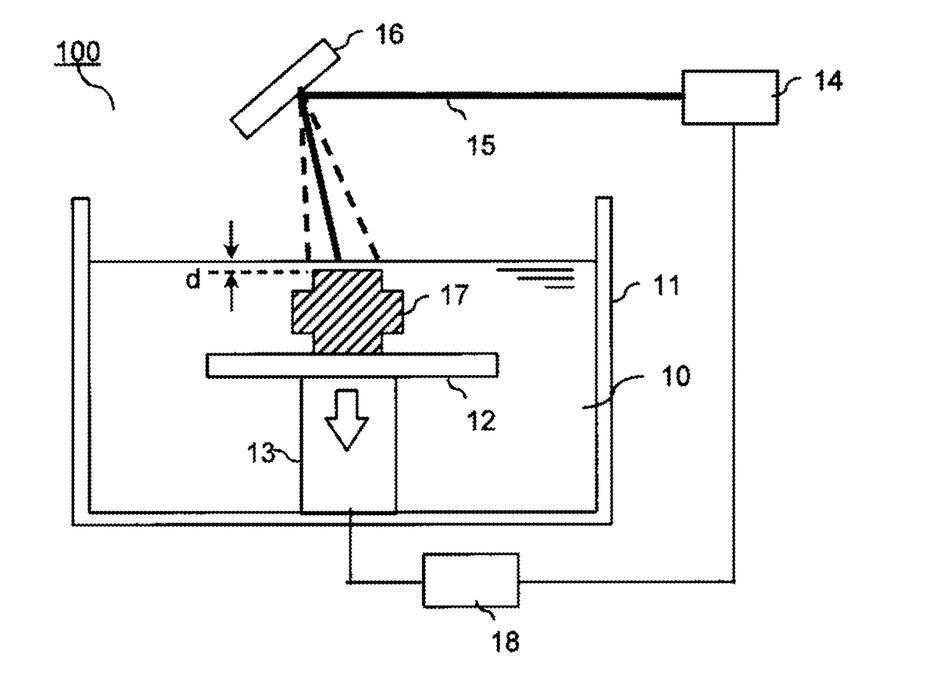
FIGURE is a diagram showing a configuration example of a stereolithography apparatus using a free liquid level method.

The present invention is described in detail below.

First, a photocurable material composition of the present invention is described. The photocurable material composition of the present invention comprises at least a monofunctional acrylate having a five-membered ring containing an ether bond and a polycarbonate resin soluble in the monofunctional acrylate having a five-membered ring containing an ether bond (hereinafter, it may be simply referred to as "polycarbonate resin"), and the content of the monofunctional acrylate having a five-membered ring containing an ether bond in the photocurable material composition is 18% by weight to 80% by weight and the content of the polycarbonate resin in the photocurable material composition is 10% by weight to 40% by weight.

The monofunctional acrylate having a five-membered ring containing an ether bond is not particularly limited as long as it does not reduce the impact resistance of a cured product obtained by polymerization of the photocurable material composition. Tetrahydrofurfuryl acrylate, (2-methyl-2-ethyl-1,3-dioxolane-4-yl)methyl acrylate, an ester of tetrahydrofurfuryl alcohol and an acrylic acid multimer (for example, Viscoat #150D manufactured by Osaka Organic Chemical Industry Ltd.), or an alkoxylated tetrahydrofurfuryl acrylate (for example, Sartomer SR 611 manufactured by Alkema Corporation) are preferable.

By using the monofunctional acrylate having a five-membered ring containing an ether bond, the adhesion of the interface with the polycarbonate resin is improved, resulting in the improvement of the rigidity when turned into a film and the impact resistance when turned into a bulk body. It can be inferred that the improvement of the adhesion is caused by an oxygen atom of a five-membered ring containing an ether bond which has the higher polarity than an oxygen atom of a six-membered ring. It is considered that since the polycarbonate resin has a polycarbonate part, the interaction between the oxygen atom of the polycarbonate part with higher polarity and the oxygen atom of a five-membered ring is strengthened, and the adhesion is improved. In addition, the monofunctional acrylate having a five-membered ring containing an ether bond is used because an acrylate having a three-membered ring or a four-membered ring containing an ether bond may undergo a ring-opening reaction caused by an acid or a base.

Furthermore, the compatibility with the polycarbonate resin is also improved by using the monofunctional acrylate having a five-membered ring containing an ether bond. The improved compatibility allows the monofunctional acrylate having a five-membered ring containing an ether bond and the polycarbonate resin to be mixed each other at the molecular level in uncured stage, so that the phase-separated structure of the cured product can be at the submicron level. On the other hand, when the compatibility is low, the phase-separated structure of the cured product is considered to be larger than that of the present invention, and it is difficult to realize high mechanical properties even if the adhesion is improved.

A polyfunctional acrylate having a five-membered ring containing an ether bond is also suitable in the sense of improving the adhesion with the polycarbonate resin. However, the use of the polyfunctional acrylate is unsuitable for the present invention because it causes a defective part of the size that cannot be visually observed that caused by high shrinkage during cured and the residual stress that caused by the increase in the crosslinking density and deteriorates the impact resistance of the film or the bulk body.

When a monofunctional methacrylate having a five-membered ring containing an ether bond is used instead of the monofunctional acrylate having a five-membered ring containing an ether bond, the mechanical properties related to the rigidity such as deflection temperature under load are improved. However, since the use of the monofunctional methacrylate having a five-membered ring containing an ether bond drastically reduces the impact resistance, in the present invention, the monofunctional methacrylate having a five-membered ring containing an ether bond cannot be used as a main component instead of the monofunctional acrylate having a five-membered ring containing an ether bond.

The content of the monofunctional acrylate having a five-membered ring containing an ether bond in the photocurable material composition is not particularly limited as long as it does not deteriorate the mechanical properties of the cured product obtained by the polymerization of the photocurable material composition. It is 18% by weight to 80% by weight in consideration of the solubility of the polycarbonate resin, the mechanical properties of the cured product obtained by polymerizing the photocurable material composition, the viscosity of the photocurable material composition, and the like.

The polycarbonate resin soluble in the monofunctional acrylate having a five-membered ring containing an ether bond is not particularly limited as long as it is uniformly soluble in the monofunctional acrylate having a five-membered ring containing an ether bond, and examples of the polycarbonate resin soluble in the monofunctional acrylate having a five-membered ring containing an ether bond include a bisphenol A type polycarbonate, a bisphenol AP type polycarbonate, a bisphenol AF type polycarbonate, a bisphenol B type polycarbonate, a bisphenol BP type polycarbonate, a bisphenol C type polycarbonate, a bisphenol E type polycarbonate, a bisphenol F type polycarbonate, a bisphenol G type polycarbonate, a bisphenol M type polycarbonate, a bisphenol S type polycarbonate, a bisphenol P type polycarbonate, a bisphenol PH type polycarbonate, a bisphenol TMC type polycarbonate, a bisphenol Z type polycarbonate, a bisphenoxyethanol fluorene type polycarbonate, a polyethylene glycol-modified bisphenoxyethanol fluorene type polycarbonate. In consideration of the solubility or the like, the bisphenol A type polycarbonate, the bisphenol B type polycarbonate, the bisphenol C type polycarbonate, the bisphenol E type polycarbonate, the bisphenol F type polycarbonate, the bisphenol G type polycarbonate, the bisphenol TMC type polycarbonate, the bisphenol Z type polycarbonate, the bisphenoxyethanol fluorene type polycarbonate, and the polyethylene glycol-modified bisphenoxyethanol fluorene type polycarbonate are preferable. To improve the solubility and the mechanical properties of the cured product obtained by polymerizing the photocurable material composition, the bisphenol C type polycarbonate, the bisphenol G type polycarbonate, the bisphenol TMC type polycarbonate, the bisphenol Z type polycarbonate, and the bisphenoxyethanol fluorene type polycarbonate are more preferable.

The molecular weight of the polycarbonate resin is not limited as long as the mechanical properties of the cured product obtained by polymerizing the photocurable material composition are not deteriorated. Preferably, the weight average molecular weight is 1000 to 200,000. In consideration of the mechanical properties of the cured product, the viscosity of the photocurable material composition, the solubility of the polycarbonate resin, and the like, the weight average molecular weight is more preferably 4000 to 50,000.

The content of the polycarbonate resin in the photocurable material composition is 10% by weight to 40% by weight in consideration of the mechanical properties of the cured product obtained by polymerizing the photocurable material composition, the solubility of the polycarbonate resin, the viscosity of the photocurable material composition, and the like. More preferably, it is 20% by weight to 33% by weight.

The photocurable material composition may further comprise a monofunctional (meth)acrylate different from the monofunctional acrylate having a five-membered ring containing an ether bond (hereinafter, it may be referred to as optional monofunctional (meth)acrylate). By including the optional monofunctional (meth)acrylate or a polyfunctional (meth)acrylate, it is possible to improve deflection temperature under load of the cured product of the photocurable material composition while maintaining the impact resistance of the cured product of the photocurable material composition.

Examples of the monofunctional (meth)acrylate different from the monofunctional acrylate having a five-membered ring containing an ether bond include, but not limited to, 4-tert-butylcyclohexyl (meth)acrylate, 3,3,5-trimethylcyclohexyl (meth)acrylate, isobornyl (meth)acrylate, cyclic trimethylolpropane formal (meth)acrylate, 3-hydroxy-1-(meth)acryloyloxyadamantane, 1-adamantyl (meth)acrylate, 2-methyl-2-adamantyl (meth)acrylate, 2-isopropyladamantane-2-yl (meth)acrylate, tetrahydrodicyclopentadienyl (meta)acrylate, alpha-(meta)acryloxy-gamma-butyrolactone, 2-hydroxy-o-phenylphenolpropyl (meta)acrylate, acryloyl morpholine, diethylacrylamide, isopropylacrylamide, hydroxyethylacrylamide, cyclohexyl (meth)acrylate, methyl (meth)acrylate, 2-ethylhexyl (meta)acrylate, 2-hydroxyethyl (meta)acrylate, 2-hydroxypropyl (meta)acrylate, lauryl (meta)acrylate, stearyl (meta)acrylate, isooctyl (meta)acrylate, tetrahydrofurfuryl methacrylate, benzyl (meta)acrylate, phenoxyethyl (meta)acrylate, phenoxypolyethylene glycol (meta)acrylate, phenylglycidyl (meth)acrylate, isodecyl (meth)acrylate, tridecyl (meth)acrylate, ethoxydiethylene glycol (meth)acrylate, methoxyditripropylene glycol (meth)acrylate, tricyclodecane (meth)acrylate, dicyclopentadieneoxyethyl (meth)acrylate, dicyclopentenyl acrylate, dicyclopentenyloxyethyl acrylate, dicyclopentenyloxymethacrylate, dicyclopentanyl acrylate, dicyclopentanyl methacrylate. Further, only one kind may be added or a plurality of kinds may be combined at the same time within a range where the mechanical properties of the cured product of the photocurable material composition are not deteriorated.

When the photocurable material composition contains the optional monofunctional (meth)acrylate, the content is preferably 48% by weight or less, more preferably 8% by weight to 48% by weight.

If the photocurable material composition contains the optional monofunctional (meth)acrylate beyond this range, the impact resistance of the obtained cured product decreases.

The photocurable material composition of the present invention may contain components other than the above components.

The photocurable material composition of the present invention may contain a polymerization initiator for copolymerizing a polymerizable functional group of the monofunctional acrylate having a five-membered ring containing an ether bond. The photocurable material composition may further contain a polymerization inhibitor, a photosensitizer, a light resistant stabilizer, a heat resistant stabilizer, an antioxidant, a release agent, an antifungal agent, a filler, a colorant, or the like, if necessary.

Examples of the polymerization initiator that generate a radical species by light irradiation include, but are not limited to, 2-benzyl-2-dimethylamino-1-(4-morpholinophenyl)-1-butanone, 1-hydroxycyclohexyl phenyl ketone, 2-hydroxy-2-methyl-1-phenyl-propan-1-one, 2,4,6-trimethylbenzoyl-diphenylphosphine oxide, bis(2,4,6-trimethylbenzoyl)-phenylphosphine oxide, 4-phenylbenzophenone, 4-phenoxybenzophenone, 4,4'-diphenylbenzophenone, 4,4'-diphenoxybenzophenone.

Iodonium (4-methylphenyl) [4-(2-methylpropyl) phenyl]-hexafluorophosphate is cited as the suitable polymerization initiator for generating cationic species by light irradiation, but is not limited thereto.

Further, examples of the polymerization initiator that generate radical species by heat include, but are not limited to, azo compounds such as azobisisobutyronitrile (AIBN), peroxides such as benzoyl peroxide, tert-butyl peroxy pivalate, tert-butyl peroxy neohexanoate, tert-hexyl peroxy neohexanoate, tert-butyl peroxy neodecanoate, tert-hexyl peroxy neodecanoate, cumyl peroxy neohexanoate, and cumyl peroxy neodecanoate.

The content of the polymerization initiator in the photocurable material composition is preferably in a range of 0.01% by mass or more and 10.00% by mass or less. Further, the polymerization initiator can be used in only one type or in combination of two or more types. Moreover, the addition ratio of the polymerization initiator to the photocurable material composition may be appropriately selected in accordance with the amount of light irradiation and the additional heating temperature. In addition, the addition ratio may be adjusted according to the target average molecular weight of the obtained polymer.

Examples of the polymerization inhibitor include a hydroquinone-based polymerization inhibitor such as hydroquinone, hydroquinone monomethyl ether, hydroquinone monoethyl ether, hydroquinone monopropyl ether, hydroquinone monobutyl ether, hydroquinone monopentyl ether, hydroquinone monohexyl ether, hydroquinone monooctyl ether and hydroquinone monoheptyl ether, and a phenol-based polymerization inhibitor having a substituent such as 3-(3,5-di-tert-butyl-4-hydroxyphenyl) propionate. Since the hydroquinone-based polymerization inhibitor such as hydroquinone or a benzoquinone-based polymerization inhibitor such as benzoquinone may turn yellow by UV irradiation, they are suitable for obtaining a thin-film cured product such as a coating.

Examples of the polymerization inhibitor during the reaction or storage include, but are not limited to, the above-mentioned polymerization inhibitors. The content of the polymerization inhibitor in the photocurable material composition is preferably in a range of 0.01% by mass or more and 1.00% by mass or less. Further, the polymerization inhibitor can be used in only one type or in combination of two or more types. Concretely, it is preferable to use a combination of the hydroquinone-based polymerization inhibitor in consideration of the smallness of coloring.

Examples of the photosensitizer include benzophenone, 4,4-diethylaminobenzophenone, 1-hydroxycyclohexylphenyl ketone, isoamyl p-(dimethylamino) benzoate, methyl 4-(dimethylamino) benzoate, benzoin, benzoin ethyl ether, benzoin isobutyl ether, benzoin isopropyl ether, 2,2-diethoxyacetophenone, methyl o-benzoylbenzoate, 2-hydroxy-2-methyl-1-phenylpropane-1-one, and acylphosphine oxide. The content of the photosensitizer in the photocurable material composition is preferably in a range of 0.01% by mass or more and 10.00% by mass or less.

The light resistant stabilizer is not particularly limited as long as it does not significantly affect the properties of the cured product of the photocurable material composition, and examples of the light resistant stabilizer include benzotriazole-based compounds such as 2-(2H-benzotriazol-2-yl)-p-cresol, 2-(2H-benzotriazol-2-yl)-4,6-bis(1-methyl-1-phenylethyl) phenol, 2-[5-chloro (2H)-benzotriazol-2-yl]-4-methyl-6-(tert-butyl) phenol, 2-(2H-benzotriazol-2-yl)-4,6-di-tert-pentylphenol, 2-(2H-benzotriazol-2-yl)-4-(1,1,3,3-tetramethylbutyl) phenol, 2,2'-methylrenebis [6-(2H-benzotriazol-2-yl)]-4-(1,1,3,3-tetramethylbutyl)phenol, and 2-(2H-benzotriazol-2-yl)-6-dodecyl-4-methylphenol, cyanoacrylate-based compounds such as ethyl 2-cyano-3, 3-diphenylacrylate, and 2-cyano-3,3-diphenylacrylic acid 2-ethylhexyl ester, triazine-based compound and benzophenone-based compounds such as octabenzone, 2,2'-4,4'-tetrahydrobenzophenone. In some cases, the light resistant stabilizer may serve as the photosensitizer, in which case the photosensitizer need not be added. The content of the light resistant stabilizer in the photocurable material composition is preferably in a range of 0.01% by mass or more and 10.00% by mass or less.

The heat resistant stabilizer is not particularly limited as long as it does not significantly affect the properties of the cured product of the photocurable material composition, and examples of the heat resistant stabilizer include alkyl esters of 7 to 9 carbon atoms having side chains such like pentaerythritol tetrakis [3-(3,5-di-tert-butyl-4-hydroxyphenyl)] propionate, octadecyl-3-(3,5-di-tert-butyl-4-hydroxyphenyl) propionate and 3,5-bis (1,1-dimethylethyl)-4-hydroxybenzenepropanoic acid, hindered phenolic compounds such like 4,6-bis (octylthiomethyl)-o-cresol, 4,6-bis(dodecylthiomethyl)-o-cresol, ethylene bis (oxyethylene) bis [3-(5-tert-butyl-4-hydroxy-m-tolyl)] propionate and hexamethylenebis [3-(3,5-di-tert-butyl-4-hydroxyphenyl)] propionate, phosphorus compounds such like tris (2,4-di-tert-butylphenyl) phosphite, and sulfur compounds such like dioctadecyl-3, 3'-thiodipropionate. The content of the heat resistant stabilizer in the photocurable material composition is preferably in a range of 0.01% by mass or more and 10.00% by mass or less.

The antioxidant is not particularly limited as long as it does not significantly affect the properties of the cured product of the photocurable material composition, and examples of the antioxidant include hindered amine compounds such as bis (2,2,6,6-tetramethyl-4-piperidyl) sebacate, bis (1,2,2,6,6-pentamethyl-4-piperidyl) [[3,5-bis (1,1-dimethylethyl)-4-hydroxyphenyl]methyl] butylmalonate. The content of the antioxidant in the photocurable material composition is preferably in a range of 0.01% by mass or more and 10.00% by mass or less.

Further, other polymerizable materials, the colorant, the filler or the like may be added to the photocurable material composition of the present invention for the purpose of adjustment of the viscosity or imparting a function to the extent that the performance of the cured product does not significantly deteriorate. The polymerizable material is not particularly limited, and is a monofunctional or two-or-more functional epoxy compound and/or an oxetane compound.

Examples of the monofunctional or two-or-more functional epoxy compound and the oxetane compound include, but are not limited to, hydrogenated bisphenol A diglycidyl ether, hydrogenated bisphenol F diglycidyl ether, hydrogenated bisphenol AD diglycidyl ether, hydrogenated bisphenol Z diglycidyl ether, cyclohexanedimethanol diglycidyl ether, tricyclodecanedimethanol diglycidyl ether, 3,4-epoxycyclohexylmethyl-3',4'-epoxycyclohexanecarboxylate, 3,4-epoxy-1-methylcyclohexyl-3,4-epoxy-1-methylcyclohexanecarboxylate, 6-methyl-3,4-epoxycyclohexylmethyl-6-methyl-3,4-epoxycyclohexanecarboxylate, 3,4-epoxy-3-methylcyclohexylmethyl-3,4-epoxy-3-methylcyclohexanecarboxylate, 3,4-epoxy-5-methylcyclohexylmethyl-3,4-epoxy-5-methylcyclohexanecarboxylate, 2-(3,4-epoxy cyclohexyl-5, 5-spiro-3,4-epoxy) cyclohexane-metadioxane, bis (3,4-epoxycyclohexylmethyl) adipate, 3,4-epoxy-6-methylcyclohexylcarboxylate, dicyclopentadienediepoxide, ethylenebis (3,4-epoxycyclohexanecarboxylate), dioctyl epoxyhexahydrophthalate, di-2-ethylhexyl epoxyhexahydrophthalate, epsilon-caprolactone-modified 3',4'-epoxycyclohexylmethyl 3,4-epoxycyclohexanecarboxylate, 1,2-epoxy-4-(2-oxiranyl) cyclohexane adduct of 2,2-bis (hydroxymethyl)-1-butanol, bis (3,4-epoxycyclohexyl) methane, 2,2-bis (3,4-epoxycyclohexyl) propane, 1,1-bis (3,4-epoxycyclohexyl) ethane, alpha-pinene oxide, campholenic aldehyde, limonene monooxide, limonene dioxide, 4-vinylcyclohexene monooxide, 4-vinylcyclohexenedioxide, 3-hydroxymethyl-3-methyloxetane, 3-hydroxymethyl-3-ethyl oxetane, 3-hydroxymethyl-3-propyl oxetane, 3-hydroxymethyl-3-n-butyl oxetane, 3-hydroxymethyl-3-propyl oxetane.

Further, when the epoxy compound and/or the oxetane compound are added, a photoacid generator or a photobase generator may be added to the photocurable material composition to promote the polymerization reaction of the epoxy compound and/or the oxetane compound. Examples of the photoacid generator include, but are not limited to, tri aryl sulfonium hexafluoroantimonate, triphenylphenacylphosphonium tetrafluoroborate, tri phenyl sulfonium hexafluoroantimonate, bis-[4-(diphenyl sulfonio) phenyl] sulfide bisdihexafluoroantimonate, bis-[4-(di 4'-hydroxyethoxyphenylsulfonio) phenyl] sulfide bisdihexafluoroantimonate, bis-[4-(diphenylsulfonio) phenyl] sulfide bisdihexafluorophosphate, diphenyliodonium tetrafluoroborate.

The filler is not particularly limited as long as it does not deteriorate the mechanical properties of the cured product of the photocurable material composition. The type of the filler is a metal salt, a metal oxide, a polymer fine particle, an inorganic fiber, an organic fiber, a carbon, or the like. Examples of the metal oxide include, but are not limited to, silicon oxide, titanium oxide, aluminum oxide. Examples of the polymer fine particle include, but are not limited to, an acrylic fine particle, a polystyrene fine particle, a nylon particle. Examples of the organic fiber include, but are not limited to, a nylon fiber and a cellulose nanofiber.

The method for preparing the photocurable material composition of the present invention is not particularly limited, and the most convenient method is to weigh all the materials and then heat and stir. If there is a concern of polymerization by heating, the polymerization inhibitor may be added as appropriate. In addition, when it is difficult to mix uniformly only by heating, it may be prepared by dissolving all the materials in a solvent such as acetone and then distilling off the solvent. Further, agitation by a disperser such as an ultrasonic homogenizer, a ball mill, or a disk mill may be used.

In the step of curing the photocurable material composition, the shape of the cured product and the curing method of the photocurable material composition are not particularly limited. Examples of the curing method include a method of applying the photocurable material composition on a substrate and then irradiating it with light, a method of injecting the photocurable material composition into a mold and then irradiating it with light, and an optical three-dimensional shaping method in which the thin-film cured product is laminated.

The method of applying the photocurable material composition on the substrate is not particularly limited. For example, a contact transfer type coating apparatus such as a roll coater, a reverse coater, a bar coater, and a slit coater, or a non-contact type coating apparatus such as a spinner (a rotary coating apparatus) and a curtain flow coater may be used, and the coating film may be formed by applying the above photocurable material composition having the resin on the substrate to a desired film thickness.

Any of the known optical three-dimensional shaping method and apparatus can be used for performing an optical three-dimensional shaping using the photocurable material composition of the present invention. Preferably, a cured layer is formed by selectively irradiating the photocurable material composition with an active energy ray so as to obtain the cured layer having a desired pattern, and then an uncured liquid photocurable resin composition is supplied to this cured layer, and similarly, the active energy ray is irradiated in order to repeat a lamination operation for newly forming the cured layer continuous with the above cured layer to finally obtain a three-dimensional shaping.

The photocurable material composition of the present invention can be used in a wide range of the optical three-dimensional shaping fields and is not particularly limited. The typical application fields include a model for verifying an appearance design during designing, a model for checking the functionality of a part, a resin mold for producing a mold, a base model for producing a mold, a direct mold for a prototype mold. In particular, the photocurable material composition of the present invention can be used as a part requiring durability because it achieves both high thermal deformation temperature and the impact resistance.

Examples of the active energy ray include ultraviolet rays, electron rays, X-rays, radiation, and high-frequency waves. Among them, ultraviolet rays having a wavelength of 300 nm to 430 nm are preferably used from an economical viewpoint, and an ultraviolet laser (for example, semiconductor pumped solid-state lasers, Ar lasers, and He—Cd lasers), a high pressure mercury lamp, an extra-high pressure mercury lamp, a mercury lamp, a xenon lamp, a halogen lamp, a metal halide lamp, an ultraviolet LED (light emitting diode), a fluorescent lamp, or the like can be used as the light source.

When forming each cured resin layer having a predetermined shape pattern by irradiating the active energy ray on a shaping surface made of the photocurable material composition, the cured resin layer may be formed by a stippling method or a line drawing method using the active energy ray narrowed in a point shape such as a laser beam. Alternatively, a shaping method in which the cured resin layer is formed by irradiating the shaping surface with the active energy ray in a plane shape through a planar drawing mask formed by arranging a plurality of minute optical shutters such as liquid crystal shutters or digital micromirror shutters (DMD) may be adopted.

FIGURE shows a configuration example of a stereolithography apparatus 100 using the free liquid level method. The stereolithography apparatus 100 has a tank 11 for containing a liquid photocurable resin composition 10. A shaping stage 12 is provided inside the tank 11 so as to be driven in a vertical direction by a driving shaft 13. The irradiation position of an active energy ray 15 emitted from a light source 14 is changed by a galvano mirror 16 controlled by a control part 18 according to slice data and the active energy ray 15 scans the surface of the tank 11. In FIGURE, the scanning range is illustratively indicated by a thick broken line. The slice data is data generated by slicing three-dimensional shape data of a three-dimensional model of an object to be shaped with a predetermined thickness in the shaping direction.

A thickness "d" of the photocurable resin composition 10 cured by the active energy ray 15 is a value determined based on the setting at the time of generation of the slice data and affects the accuracy of an obtained shaping 17 (reproducibility of three-dimensional shape data). The thickness d is achieved by the control part 18 controlling the driving amount of the driving shaft 13.

First, the control part 18 controls the driving shaft 13 based on the setting, and the photocurable resin composition 10 with a thickness d is supplied onto the shaping stage 12. The liquid photocurable resin composition 10 on the shaping stage 12 is selectively irradiated with the active energy ray 15 based on the slice data and the photocurable resin composition 10 is cured to form a cured product according to the slice data. Next, the shaping stage 12 is moved by a distance corresponding to the thickness d in the direction of the hollow arrow, and the uncured photocurable resin composition 10 with the thickness d is supplied to the surface of the cured product. Then, when the uncured photocurable resin composition 10 is irradiated with the active energy ray 15 based on the slice data, the cured product integrated with the cured product formed previously is formed. Thus, by repeating the step of curing the photocurable resin composition in layers, the desired three-dimensional cured product (shaping) 17 can be obtained.

After the shaping thus obtained is taken out of the tank 11 and the unreacted photocurable resin composition remaining on the surface of the shaping is removed, post-treatment such as washing or post-curing by heat treatment is carried out as necessary and it may be treated as a final article. By post-curing, the unreacted photocurable resin composition which may remain on the surface and inside of the shaping can be cured and the stickiness of the surface of the shaping can be suppressed. Further, the initial strength of the shaping can be improved.

A regulated liquid level method is also preferable. In the configuration of the stereolithography apparatus using the regulated liquid level method, the shaping stage 12 of the stereolithography apparatus 100 shown in FIG. 1s provided so as to pull the cured product up, and the light irradiation means is provided below the tank 11. Typical examples of shaping by the regulated liquid level method are as follows. First, the photocurable resin composition is supplied between a supporting surface of a supporting stage provided to be movable up and down and the bottom surface of the tank. The supporting surface of the supporting stage and the bottom surface of the tank containing the photocurable resin composition are disposed to have the predetermined distance d from each other. Next, the photocurable resin composition between the supporting surface of the supporting stage and the bottom surface of the tank is irradiated from the bottom surface side of the tank containing the photocurable resin composition with the active energy ray according to the slice data. By the irradiation of the active energy ray, the photocurable resin composition between the supporting surface of the supporting stage and the bottom surface of the tank is cured to form the cured product. After that, the cured product is pulled away from the bottom of the tank by raising the supporting stage.

Subsequently, the height of the supporting stage is adjusted so that the distance between the cured product formed on the supporting stage and the bottom surface of the tank becomes the predetermined distance d and at the same time, the uncured photocurable resin composition is supplied between the cured product on the supporting stage and the bottom surface of the tank. Then, the active energy ray selected accordingly to the slice data is irradiated to the uncured photocurable resin composition, as described above, and the cured product integrated with the cured product formed previously is formed. By repeating this process multiple times, the shaping in which the cured product of the photocurable resin composition is laminated and integrated can be obtained.

Although examples of manufacturing an article by curing the photocurable resin composition according to the present invention by the optical three-dimensional shaping method have been described above, the applications are not limited thereto. By polymerizing the photocurable resin composition according to the present invention by light irradiation, a protective film, a coating film, a sealant and the like can be produced. Alternatively, an article can be manufactured by pouring the photocurable resin composition according to the present invention into the mold as a raw material, and then irradiating it with light to polymerize the photocurable resin composition. In any application, the cured product of the photocurable resin composition according to the present invention can achieve both high thermal deformation temperature and the high impact resistance.

EXAMPLES

The present invention is described more in detail below by way of Examples, but the present invention is not limited to the Examples described below unless it is beyond the scope thereof.

Example 1

(1) Preparation of the Photocurable Material Composition

Tetrahydrofurfuryl acrylate 28.0 g as the monofunctional acrylate having a five-membered ring containing an ether bond, the bisphenol Z-type polycarbonate resin (manufactured by Mitsubishi Gas Chemical Company, Inc., average molecular weight 20,000) 7.0 g as the polycarbonate resin, and 2,4,6-trimethylbenzoyl-diphenylphosphine oxide (manufactured by Tokyo Chemical Industry Co., Ltd.) 0.22 g as the polymerization initiator were weighed. They were put into an airtight container and heated and stirred (VMRC-5 manufactured by As One Corporation) at 50° C. for 24 hours to prepare the photocurable material composition.

(2) Preparation of Evaluation Samples

The mold trimmed in a size of 4 mm×10 mm×80 mm was placed on a quartz plate coated with the mold release agent. The photocurable material composition prepared as described above was poured into the mold and sandwiched between the quartz plates coated with the mold release agent and fixed. The photocurable material composition was cured by irradiating from the front surface and from the rear surface two times respectively with light having a wavelength of 365 nm at 10 mW for 120 seconds using an ultraviolet integrated light meter (the product name: UTI-250, manufactured by Ushio Inc.). After that, a prismatic shaping was released from the mold. The obtained shaping was heat-treated at 50° C. for 1 hour and then heat-treated at 100° C. for 1 hour to serve as evaluation samples.

(3) Evaluation Method

The evaluation of deflection temperature under load (thermal deformation temperature) using the HDT tester manufactured by Toyo Seiki Seisaku-sho, Ltd. and Charpy impact strength (impact resistance) using the impact tester and the notching machine manufactured by Toyo Seiki Seisaku-sho, Ltd. was carried out by assessing the evaluation samples under the test conditions in accordance with JIS K 7191-1 A method and JIS K 7111-1, and judged by the following criteria. The results are shown in Table 1.

(Evaluation Criteria)

A: deflection temperature under load of 70° C. or more and Charpy impact strength of 20 kJ/m$^2$ or more.
B: deflection temperature under load of 40° C. or more and less than 70° C. and Charpy impact strength of 20 kJ/m$^2$ or more.
C: deflection temperature under load of less than 40° C. or Charpy impact strength of less than 20 kJ/m$^2$.

The evaluation sample with the evaluation criterion A has the same deflection temperature under load and Charpy impact strength as ABS resin. The evaluation sample with the evaluation criterion B is not as good as the ABS resin, but has the performance of both deflection temperature under load and Charpy impact strength exceeding the cured product obtained from the conventional photocurable material composition. On the other hand, the evaluation sample with the evaluation criterion C has the same deflection temperature under load and Charpy impact strength as the cured product obtained from the conventional photocurable material composition.

Example 2

The photocurable material composition was prepared in the same manner as in Example 1 except that the amount of the polycarbonate resin was changed to 14.0 g. The evaluation samples were prepared by the same method as in Example 1 using this photocurable material composition, and evaluated by the method described in Example 1. The evaluation results are shown in Table 1.

Example 3

The photocurable material composition was prepared in the same manner as in Example 1, except that the amount of tetrahydrofurfuryl acrylate was changed to 24.5 g, the amount of the polycarbonate resin was changed to 14.0 g and 3.5 g of cyclic trimethylolpropaneformal acrylate was added as the optional monofunctional (meth)acrylate. The evaluation samples were prepared by the same method as in Example 1 using this photocurable material composition, and evaluated by the method described in Example 1. The evaluation results are shown in Table 1.

Example 4

The photocurable material composition was prepared in the same manner as in Example 1, except that the amount of tetrahydrofurfuryl acrylate was changed to 8.0 g, the amount of the polycarbonate resin was changed to 14.0 g and 20.0 g of cyclic trimethylolpropaneformal acrylate was added as the optional monofunctional (meth)acrylate. The evaluation samples were prepared by the same method as in Example 1 using this photocurable material composition, and evaluated by the method described in Example 1. The evaluation results are shown in Table 1.

Example 5

The photocurable material composition was prepared in the same manner as in Example 1, except that the polycarbonate resin replaced with EP-6000 manufactured by Mitsubishi Gas Chemical Company, Inc. The evaluation samples were prepared by the same method as in Example 1 using this photocurable material composition, and evaluated by the method described in Example 1. The evaluation results are shown in Table 1.

Example 6

The photocurable material composition was prepared in the same manner as in Example 1, except that the polycarbonate resin replaced with BIS-C manufactured by Mitsubishi Gas Chemical Company, Inc. The evaluation samples were prepared by the same method as in Example 1 using this photocurable material composition, and evaluated by the method described in Example 1. The evaluation results are shown in Table 1.

Example 7

The photocurable material composition was prepared in the same manner as in Example 1, except that tetrahydrofurfuryl acrylate replaced with alkoxylated tetrahydrofurfuryl acrylate (Sartomer SR 611 manufactured by Alkema Corporation), and the polycarbonate resin replaced with FPC-0220 manufactured by Mitsubishi Gas Chemical Company, Inc. The evaluation samples were prepared by the same method as in Example 1 using this photocurable material composition, and evaluated by the method described in Example 1. The evaluation results are shown in Table 1.

Example 8

The photocurable material composition was prepared in the same manner as in Example 1, except that tetrahydrofurfuryl acrylate replaced with (2-methyl-2-ethyl-1,3-dioxolane-4-yl)methyl acrylate. The evaluation samples were prepared by the same method as in Example 1 using this photocurable material composition, and evaluated by the method described in Example 1. The evaluation results are shown in Table 1.

Example 9

The photocurable material composition was prepared in the same manner as in Example 1, except that tetrahydrofurfuryl acrylate replaced with the ester of tetrahydrofurfuryl alcohol and an acrylic acid multimer (Viscoat #150D manufactured by Osaka Organic Chemical Industry Ltd.). The evaluation samples were prepared by the same method as in Example 1 using this photocurable material composition, and evaluated by the method described in Example 1. The evaluation results are shown in Table 1.

Example 10

The photocurable material composition was prepared in the same manner as in Example 1, except that the amount of tetrahydrofurfuryl acrylate was changed to 24.5 g, and 3.5 g of isobornyl methacrylate was added as the optional monofunctional (meth)acrylate. The evaluation samples were prepared by the same method as in Example 1 using this photocurable material composition, and evaluated by the method described in Example 1. The evaluation results are shown in Table 1.

Example 11

The photocurable material composition was prepared in the same manner as in Example 1, except that the amount of tetrahydrofurfuryl acrylate was changed to 24.5 g, and 3.5 g of 1-adamantyl acrylate was added as the optional monofunctional (meth)acrylate. The evaluation samples were prepared by the same method as in Example 1 using this photocurable material composition, and evaluated by the method described in Example 1. The evaluation results are shown in Table 1.

Example 12

The photocurable material composition was prepared in the same manner as in Example 1, except that the amount of tetrahydrofurfuryl acrylate was changed to 25.0 g, the amount of the polycarbonate resin was changed to 14.0 g and 3.0 g of cyclic trimethylolpropaneformal acrylate was added as the optional monofunctional (meth)acrylate. The evaluation samples were prepared by the same method as in Example 1 using this photocurable material composition, and evaluated by the method described in Example 1. The evaluation results are shown in Table 1.

Comparative Example 1

The photocurable material composition was prepared in the same manner as in Example 1, except that tetrahydrofurfuryl acrylate replaced with tetrahydrofurfuryl methacrylate. The evaluation samples were prepared by the same method as in Example 1 using this photocurable material composition, and evaluated by the method described in Example 1. The evaluation results are shown in Table 1.

Comparative Example 2

The photocurable material composition was prepared in the same manner as in Example 1, except that tetrahydrofurfuryl acrylate replaced with cyclic trimethylolpropaneformal acrylate. The evaluation samples were prepared by the same method as in Example 1 using this photocurable material composition, and evaluated by the method described in Example 1. The evaluation results are shown in Table 1.

Comparative Example 3

The photocurable material composition was prepared in the same manner as in Example 1, except that the amount of tetrahydrofurfuryl acrylate was changed to 7.0 g, the amount of the polycarbonate resin was changed to 14.0 g and 21.0 g of cyclic trimethylolpropaneformal acrylate was added as the optional monofunctional (meth)acrylate. The evaluation samples were prepared by the same method as in Example 1 using this photocurable material composition, and evaluated by the method described in Example 1. The evaluation results are shown in Table 1.

TABLE 1

| | acrylate | weight (g) | content (%) | polycarbonate resin | weight (g) | content (%) | content of polymerization initiator (% by weight) | Charpy impact strength [kJ/m²] | deflection temperature under load [° C.] | Evaluation |
|---|---|---|---|---|---|---|---|---|---|---|
| Example 1 | monofunctional acrylate 1 | 28.0 | 79.5 | polycarbonate resin 1 | 7.0 | 19.9 | 0.62 | 33.3 | 47.7 | B |
| Example 2 | monofunctional acrylate 1 | 28.0 | 66.3 | polycarbonate resin 1 | 14.0 | 33.2 | 0.52 | 36.0 | 69.4 | B |
| Example 3 | monofunctional acrylate 1 optional monofunctional (meth)acrylate 2 | 24.5 3.5 | 58.0 8.3 | polycarbonate resin 1 | 14.0 | 33.2 | 0.58 | 39.2 | 71 | A |
| Example 4 | monofunctional acrylate 1 optional monofunctional (meth)acrylate 1 | 8.0 20.0 | 18.9 47.4 | polycarbonate resin 1 | 14.0 | 33.2 | 0.58 | 56.0 | 80.2 | A |
| Example 5 | monofunctional acrylate 1 | 28.0 | 79.5 | polycarbonate resin 2 | 7.0 | 19.9 | 0.62 | 51.3 | 40.8 | B |
| Example 6 | monofunctional acrylate 1 | 28.0 | 79.5 | polycarbonate resin 3 | 7.0 | 19.9 | 0.62 | 38.4 | 43.6 | B |
| Example 7 | monofunctional acrylate 2 | 28.0 | 79.5 | polycarbonate resin 4 | 7.0 | 19.9 | 0.62 | 59.0 | 47.3 | B |
| Example 8 | monofunctional acrylate 3 | 28.0 | 79.5 | polycarbonate resin 1 | 7.0 | 19.9 | 0.62 | 35.9 | 42.3 | B |
| Example 9 | monofunctional acrylate 4 | 28.0 | 79.5 | polycarbonate resin 1 | 7.0 | 19.9 | 0.62 | 25.3 | 46.7 | B |
| Example 10 | monofunctional acrylate 1 optional monofunctional (meth)acrylate 2 | 28.0 3.5 | 72.3 9.0 | polycarbonate resin 1 | 7.0 | 18.1 | 0.57 | 31.2 | 52.1 | B |
| Example 11 | monofunctional acrylate 1 optional monofunctional (meth)acrylate 3 | 24.5 3.5 | 69.6 9.94 | polycarbonate resin 1 | 7.0 | 19.9 | 0.62 | 58.6 | 52.1 | B |
| Example 12 | monofunctional acrylate 1 optional monofunctional (meth)acrylate 1 | 25 3 | 59.2 7.1 | polycarbonate resin 1 | 14.0 | 33.2 | 0.58 | 36.2 | 69.8 | B |
| Comparative Example 1 | optional monofunctional (meth)acrylate 4 | 28.0 | 79.5 | polycarbonate resin 1 | 7.0 | 19.9 | 0.62 | 1.0 | 81.2 | C |
| Comparative Example 2 | optional monofunctional (meth)acrylate 1 | 28.0 | 79.5 | polycarbonate resin 1 | 7.0 | 19.9 | 0.62 | 1.5 | 76.7 | C |
| Comparative Example 3 | monofunctional acrylate 1 optional monofunctional (meth)acrylate 1 | 7.0 21.0 | 16.5 49.8 | polycarbonate resin 1 | 14.0 | 33.2 | 0.58 | 1.4 | 75.1 | C |

In Table 1, abbreviations refer to the following compounds.

Monofunctional acrylate 1: tetrahydrofurfuryl acrylate
Monofunctional acrylate 2: alkoxylated tetrahydrofurfuryl acrylate
Monofunctional acrylate 3: (2-methyl-2-ethyl-1,3-dioxolane-4-yl)methyl acrylate
Monofunctional acrylate 4: the ester of tetrahydrofurfuryl alcohol and an acrylic acid multimer
Optional monofunctional (meth)acrylate 1: cyclic trimethylolpropaneformal acrylate
Optional monofunctional (meth)acrylate 2: isobornyl methacrylate
Optional monofunctional (meth)acrylate 3: 1-adamantyl acrylate
Optional monofunctional (meth)acrylate 4: tetrahydrofurfuryl methacrylate
Polycarbonate resin 1: the bisphenol Z-type polycarbonate resin (average molecular weight 20,000)
Polycarbonate resin 2: EP-6000 manufactured by Mitsubishi Gas Chemical Company, Inc.

Polycarbonate resin 3: BIS-C manufactured by Mitsubishi Gas Chemical Company, Inc.

Polycarbonate resin 4: FPC-0220 manufactured by Mitsubishi Gas Chemical Company, Inc.

According to the present invention, it is possible to provide the photocurable material composition having the cured product by light irradiation which have both deflection temperature under load of 40° C. or more and Charpy impact strength (with a notch) of 20 kJ/m$^2$ or more and the cured product thereof. Therefore, by using the photocurable material composition of the present invention, it is possible to obtain the cured product having mechanical properties which cannot be obtained by the conventional photocurable material composition. While the strength of the part using the conventional photocurable material composition is insufficient, the strength of the part using the photocurable material composition of the present invention is sufficient. In addition, it is possible to provide parts which can be used as not only models but also products by using the photocurable material composition of the present invention in the optical three-dimensional shaping method, and products produced in small quantities can be directly produced without using the mold.

The photocurable material composition of the present invention and the cured product thereof have high thermal deformation temperature and the high impact resistance as compared with a conventional material cured by the active energy ray, so they can be used for producing the coating material or the part requiring durability by photocuring.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A photocurable material composition comprising at least a monofunctional acrylate having a five-membered ring containing an ether bond and a polycarbonate resin soluble in the monofunctional acrylate having the five-membered ring containing the ether bond,
    wherein a content of the monofunctional acrylate having the five-membered ring containing the ether bond is 18% by weight to 80% by weight and a content of the polycarbonate resin is 20% by weight to 40% by weight.

2. The photocurable material composition according to claim 1, wherein the monofunctional acrylate having the five-membered ring containing the ether bond is selected from the group consisting of tetrahydrofurfuryl acrylate, (2-methyl-2-ethyl-1,3-dioxolane-4-yl)methyl acrylate, an ester of tetrahydrofurfuryl alcohol and an acrylic acid multimer, and an alkoxylated tetrahydrofurfuryl acrylate.

3. The photocurable material composition according to claim 1, wherein the polycarbonate resin is at least one selected from the group consisting of bisphenol A type, bisphenol B type, bisphenol C type, bisphenol E type, bisphenol F type, bisphenol G type, bisphenol M type, bisphenol P type, bisphenol PH type, bisphenol TMC type, bisphenol Z type, and bisphenoxyethanol fluorene type.

4. The photocurable material composition according to claim 3, wherein the polycarbonate resin is selected from the group consisting of bisphenol A type, bisphenol B type, bisphenol C type, bisphenol E type, bisphenol F type, bisphenol G type, bisphenol TMC type, bisphenol Z type, and bisphenoxyethanol fluorene type.

5. The photocurable material composition according to claim 4, wherein the polycarbonate resin is at least one selected from the group consisting of bisphenol C type, bisphenol Z type, and bisphenoxyethanol fluorene type.

6. The photocurable material composition according to claim 1, further comprising a monofunctional (meth)acrylate different from the monofunctional acrylate having the five-membered ring containing the ether bond.

7. The photocurable material composition according to claim 6, wherein a content of the monofunctional (meth)acrylate different from the monofunctional acrylate having the five-membered ring containing the ether bond is 8% by weight to 48% by weight.

8. The photocurable material composition according to claim 6, wherein the monofunctional (meth)acrylate different from the monofunctional acrylate having the five-membered ring containing the ether bond is at least one selected from the group consisting of 4-tert-butylcyclohexyl (meth)acrylate, 3,3,5-trimethylcyclohexyl (meth)acrylate, isobornyl (meth)acrylate, cyclic trimethylolpropane formal (meth)acrylate, 3-hydroxy-1-(meth)acryloyloxyadamantane, 1-adamantyl (meth)acrylate, 2-methyl-2-adamantyl (meth)acrylate, 2-isopropyladamantane-2-yl (meth)acrylate, cyclohexyl (meth)acrylate, methyl (meth)acrylate, and tricyclodecane (meth)acrylate.

9. The photocurable material composition according to claim 1, which is suitable to be used for an optical three-dimensional shaping method.

10. A cured product obtained by copolymerizing a photocurable material composition comprising at least a monofunctional acrylate having a five-membered ring containing an ether bond and a polycarbonate resin soluble in the monofunctional acrylate having the five-membered ring containing the ether bond,
    wherein a content of the monofunctional acrylate having the five-membered ring containing the ether bond is 18% by weight to 80% by weight and a content of the polycarbonate resin is 20% by weight to 40% by weight.

11. A method of manufacturing an article using an optical three-dimensional shaping method comprising:
    a step of supplying a photocurable material composition to a predetermined thickness; and
    a step of irradiating the photocurable material composition with an active energy ray to cure the photocurable material composition based on slice data of a three-dimensional model of an object to be shaped,
    wherein the photocurable material composition comprises at least a monofunctional acrylate having a five-membered ring containing an ether bond and a polycarbonate resin soluble in the monofunctional acrylate having the five-membered ring containing the ether bond,
    wherein a content of the monofunctional acrylate having the five-membered ring containing the ether bond is 18% by weight to 80% by weight and a content of the polycarbonate resin is 20% by weight to 40% by weight.

12. A method of manufacturing an article according to claim 11, further comprising a step of heating a shaped article obtained by irradiating with the active energy ray.

13. A method of manufacturing an article according to claim 11, wherein the active energy ray is ultraviolet light having a wavelength of 300 to 430 nm.

14. A method of manufacturing an article using a mold, comprising:
   a step of pouring a raw material into the mold; and
   a step of irradiating the raw material poured into the mold with light,
   wherein the raw material is a photocurable material composition comprising at least a monofunctional acrylate having a five-membered ring containing an ether bond and a polycarbonate resin soluble in the monofunctional acrylate having the five-membered ring containing the ether bond,
   wherein a content of the monofunctional acrylate having the five-membered ring containing the ether bond is 18% by weight to 80% by weight and a content of the polycarbonate resin is 20% by weight to 40% by weight.

15. The photocurable material composition according to claim 1, wherein a content of the polycarbonate resin is 33% by weight.

16. The photocurable material composition according to claim 1, further comprising a polymerization initiator for copolymerizing a polymerizable functional group of the monofunctional acrylate having the five-membered ring skeleton containing the ether bond.

17. The photocurable material composition according to claim 16, wherein the polymerization initiator comprises at least one selected from the group consisting of 2-benzyl-2-dimethylamino-1-(4-morpholinophenyl)-1-butanone, 1-hydroxycyclohexyl phenyl ketone, 2-hydroxy-2-methyl-1-phenyl-propan-1-one, 2,4,6-trimethylbenzoyl-diphenylphosphine oxide, bis(2,4,6-trimethylbenzoyl)-phenylphosphine oxide, 4-phenylbenzophenone, 4-phenoxybenzophenone, 4,4'-diphenylbenzophenone, and 4,4'-diphenoxybenzophenone.

18. The photocurable material composition according to claim 16, wherein the polymerization initiator comprises at least one selected from the group consisting of azobisisobutyronitrile (AIBN), benzoyl peroxide, tert-butyl peroxy pivalate, tert-butyl peroxy neohexanoate, tert-hexyl peroxy neohexanoate, tert-butylperoxy neodecanoate, tert-hexyl peroxy neodecanoate, cumyl peroxy neohexanoate, and cumyl peroxy neodecanoate.

19. The photocurable material composition according to claim 16, wherein a content of the polymerization initiator is 0.01% by mass to 10.00% by mass with respect to the photocurable material composition.

20. The photocurable material composition according to claim 1, wherein a molecular weight of the polycarbonate resin is 4,000 to 50,000.

* * * * *